United States Patent
Heo

(10) Patent No.: US 11,496,689 B2
(45) Date of Patent: Nov. 8, 2022

(54) IMAGE SENSOR MODULE IMAGE COMPRESSION METHOD THEREOF AND ELECTRONIC DEVICE

(71) Applicant: Samsung Electronics Co., Ltd., Suwon-si (KR)

(72) Inventor: Eundoo Heo, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 218 days.

(21) Appl. No.: 17/038,337

(22) Filed: Sep. 30, 2020

(65) Prior Publication Data
US 2021/0243348 A1   Aug. 5, 2021

(30) Foreign Application Priority Data
Feb. 5, 2020   (KR) .................. 10-2020-0013735

(51) Int. Cl.
| | | |
|---|---|---|
| *H04N 5/235* | (2006.01) | |
| *G06T 5/50* | (2006.01) | |
| *G06T 3/40* | (2006.01) | |
| *G06T 9/00* | (2006.01) | |
| *G06T 5/00* | (2006.01) | |

(52) U.S. Cl.
CPC .............. *H04N 5/2353* (2013.01); *G06T 3/40* (2013.01); *G06T 5/009* (2013.01); *G06T 5/50* (2013.01); *G06T 9/00* (2013.01); *H04N 5/2351* (2013.01); *H04N 5/2355* (2013.01); *G06T 2207/20224* (2013.01)

(58) Field of Classification Search
None
See application file for complete search history.

(56) References Cited

U.S. PATENT DOCUMENTS

| | | | |
|---|---|---|---|
| 8,723,978 B2 | 5/2014 | Kwon et al. | |
| 9,363,432 B2 | 6/2016 | Omori et al. | |
| 9,451,173 B2 | 9/2016 | Kang et al. | |
| 2003/0142745 A1* | 7/2003 | Osawa ............ | H04N 7/181 |
| | | | 348/E7.086 |

(Continued)

FOREIGN PATENT DOCUMENTS

| | | |
|---|---|---|
| JP | 4379334 A | 12/2009 |
| JP | 2013-090095 A | 5/2013 |

(Continued)

*Primary Examiner* — Quan Pham
(74) *Attorney, Agent, or Firm* — Muir Patent Law, PLLC

(57) ABSTRACT

An image sensor module includes an image sensor, the image sensor module being configured such that the image sensor outputs a plurality of images and the plurality of images having a plurality of exposure times different from each other, a reference image selector circuit outputting reference image selection information for selecting a reference image, from among the plurality of images, based on a reference brightness value, and an image compressor circuit outputting a compression image data including at least one packing data and the reference image, based on the reference image selection information. The at least one packing data respectively corresponds to at least one remaining image other than the reference image, from among the plurality of images, and is generated based on a ratio of an exposure time of a corresponding image to an exposure time of the reference image.

20 Claims, 12 Drawing Sheets

(56) References Cited

U.S. PATENT DOCUMENTS

| | | | |
|---|---|---|---|
| 2016/0148356 A1* | 5/2016 | Dabral | H04N 5/2355 |
| | | | 382/166 |
| 2018/0103258 A1 | 4/2018 | Chen et al. | |
| 2018/0176604 A1 | 6/2018 | Chesnokov | |
| 2018/0276783 A1* | 9/2018 | Yasuda | G06T 5/40 |
| 2019/0141229 A1 | 5/2019 | Kamiya et al. | |
| 2019/0306398 A1* | 10/2019 | Min | H01L 27/14605 |
| 2020/0112666 A1* | 4/2020 | Fujimoto | H04N 5/243 |
| 2020/0137290 A1 | 4/2020 | Lee et al. | |

FOREIGN PATENT DOCUMENTS

| | | |
|---|---|---|
| JP | 2013-258501 A | 12/2013 |
| JP | 2015-023498 A | 2/2015 |
| KR | 10-2015-0067708 A | 6/2015 |
| KR | 10-2015-0099302 A | 8/2015 |
| KR | 101633893 B1 | 6/2016 |
| KR | 1020190010040 A | 1/2019 |
| KR | 1020190022558 A | 3/2019 |

* cited by examiner

IMG_1 (low exposure)

IMG_2 (middle exposure)

IMG_3 (high exposure)

FIG. 4

| IMG_Comp | IMG_Ref | DATA_Pack_1 | DATA_Pack_2 | . . . | DATA_Pack_N-1 |

| DATA_Pack_1 | DATA_Sat | Data_Sign | DATA_DB | DATA_Disparity |

FIG. 10A

| IPV1(1,2)=40 | IPV1(2,2)=43 | | | IPV1(1,w)=200 |
|---|---|---|---|---|
| IPV1(1,1)=20 | IPV1(2,1)=80 | | | |
| | | | | |
| IPV1(h,1)=125 | | | | IPV1(h,w)=301 |

IMG_1
(Reference Image)

| IPV2(1,2)=119 | IPV2(2,2)=126 | | | IPV2(1,w)=600 |
|---|---|---|---|---|
| IPV2(1,1)=62 | IPV2(2,1)=245 | | | |
| | | | | |
| IPV2(h,1)=364 | | | | IPV2(h,w)=903 |

IMG_2

| IPV3(1,2)=362 | IPV3(2,2)=380 | | | IPV3(1,w)=1023 |
|---|---|---|---|---|
| IPV3(1,1)=190 | IPV3(2,1)=722 | | | |
| | | | | |
| IPV3(h,1)=1023 | | | | IPV3(h,w)=1023 |

IMG_3

FIG. 10B

| DRV2(1,1) = −2 | DRV2(1,2) = 1 | ... | DRV2(1,w) = 0 |
|---|---|---|---|
| DRV2(2,1) = −5 | DRV2(2,2) = 3 | | |
| ⋮ | | ⋱ | |
| DRV2(h,1) = 11 | | | DRV2(h,w) = 0 |

DATA_Disparity_Raw_2

| DRV3(1,1) = −10 | DRV3(1,2) = −2 | ... | DRV3(1,w) = 777 |
|---|---|---|---|
| DRV3(2,1) = −2 | DRV3(2,2) = 7 | | |
| ⋮ | | ⋱ | |
| DRV3(h,1) = 102 | | | DRV3(h,w) = 1686 |

DATA_Disparity_Raw_3

FIG. 10C

| DATA_Pack_2 | DATA_Sat | Data_Sign | DATA_DB | DATA_Disparity |
|---|---|---|---|---|
| | Saturation Bit | Sign Bit | Disparity Bit | Disparity |
| DP2 (1,1) | 0 | 1 | 0100 | 0010 |
| DP2 (1,2) | 0 | 0 | 0100 | 0001 |
| ... | ... | ... | ... | ... |
| DP2 (1,w) | 0 | 0 | 0100 | 0000 |
| DP2 (2,1) | 0 | 1 | 0100 | 0101 |
| DP2 (2,2) | 0 | 0 | 0100 | 0011 |
| ... | ... | ... | ... | ... |
| DP2 (h,1) | 0 | 0 | 0100 | 1011 |
| ... | ... | ... | ... | ... |
| DP2 (h,w) | 0 | 0 | 0100 | 0000 |

FIG. 10D

| DATA_Pack_3 | DATA_Sat | Data_Sign | DATA_DB | DATA_Disparity |
|---|---|---|---|---|
| | Saturation Bit | Sign Bit | Disparity Bit | Disparity |
| DP3 (1,1) | 0 | 1 | 0100 | 1010 |
| DP3 (1,2) | 0 | 1 | 0100 | 0010 |
| ⋮ | | ⋮ | | |
| DP3 (1,w) | 1 | 0 | 0100 | 0000 |
| DP3 (2,1) | 0 | 0 | 0100 | 0010 |
| DP3 (2,2) | 0 | 0 | 0100 | 0111 |
| ⋮ | | ⋮ | | |
| DP3 (h,1) | 1 | 0 | 0100 | 0000 |
| ⋮ | | ⋮ | | |
| DP3 (h,w) | 1 | 0 | 0100 | 0000 |

IMAGE SENSOR MODULE IMAGE COMPRESSION METHOD THEREOF AND ELECTRONIC DEVICE

CROSS-REFERENCE TO RELATED APPLICATION

This application claims the benefit of Korean Patent Application No. 10-2020-0013735, filed on Feb. 5, 2020, in the Korean Intellectual Property Office, the disclosure of which is incorporated by reference herein in its entirety.

BACKGROUND

The inventive concept relates to an image sensor module, an image compression method of the image sensor module, and an electronic device, and more particularly, to an image sensor module configured to process images of a multiple exposure image, which correspond to a plurality of exposure times, an image compression method of the image sensor module, and an electronic device.

An electronic device configured to process an image may obtain raw image data using an image sensor and process the obtained raw image data using various algorithms.

A dynamic range of an image refers to the difference in the brightness range between the darkest portion and the brightest portion in the image. The dynamic range may be defined as a ratio between a luminance value (i.e., brightness) of the brightest pixel and a luminance value of the darkest pixel. A process of adjusting the dynamic range may include adjusting a pixel value indicating a brightness (e.g., a luminance) of the image. A technique of increasing film quality by improving the dynamic range of the image may be called a high dynamic range (HDR) method.

There are various HDR methods, which include a method of obtaining multiple exposure images by capturing images of the same subject plural times with different exposure times and synthesizing the multiple exposure images to increase the dynamic range of an image taken for a shot, for example, in a camera.

SUMMARY

The inventive concept provides an image sensor module, an image compression method of the image sensor module, and an electronic device, which may provide a multiple exposure image instead of a synthesized image to a processor and reduce the amount of data transmitted and received between the processor and the image sensor module.

According to an exemplary embodiment of the present inventive concept, an image sensor module includes an image sensor, the image sensor module being configured such that the image sensor outputs a plurality of images and the plurality of images having a plurality of exposure times different from each other, a reference image selector circuit outputting reference image selection information for selecting a reference image, from among the plurality of images, based on a reference brightness value, and an image compressor circuit outputting a compression image data including at least one packing data and the reference image, based on the reference image selection information. The at least one packing data respectively corresponds to at least one remaining image other than the reference image, from among the plurality of images, and is generated based on a ratio of an exposure time of a corresponding image to an exposure time of the reference image.

According to an exemplary embodiment of the present inventive concept, an image compression method of an image sensor module includes obtaining a plurality of images corresponding to a plurality of exposure times, selecting a reference image based on a reference brightness value from among the plurality of images, generating at least one packing data, the at least one packing data respectively corresponding to at least one remaining image other than the reference image from among the plurality of images, and each of the at least one packing data including a disparity indicating a difference between a correction reference image, which corresponds to the reference image corrected based on an exposure time ratio of an exposure time of a corresponding image to an exposure time of the reference image, and the corresponding image, and outputting the reference image and the at least one packing data as compressed image data.

According to an exemplary embodiment of the present inventive concept, an electronic device includes an image sensor module configured to generate a plurality of images corresponding to a plurality of exposure times and output a compression image data including at least one packing data and a reference image selected from among the plurality of images, the at least one packing data respectively corresponding to at least one remaining image other than the reference image, and a processor configured to reconstruct the at least one remaining image from the compression image data, based on information about the reference image, the at least one packing data, and the plurality of exposure times, and generate a high-dynamic-range (HDR) image based on the reference image and the at least one remaining image that is reconstructed.

BRIEF DESCRIPTION OF THE DRAWINGS

Embodiments of the inventive concept will be more clearly understood from the following detailed description taken in conjunction with the accompanying drawings in which:

FIG. 4 illustrates compression image data according to an example embodiment;

FIGS. 10A to 10D are diagrams illustrating a process of generating compression image data based on a multiple exposure image, according to an example embodiment;

DETAILED DESCRIPTION OF THE EMBODIMENTS

Embodiments will now be described with reference to the accompanying drawings.

Figure 1:
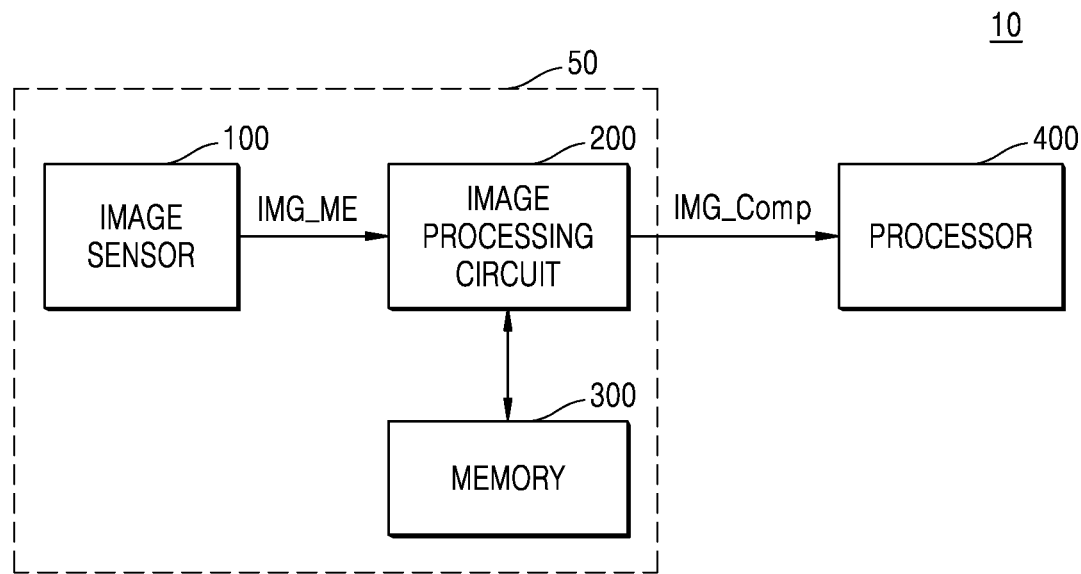
FIG. 1 illustrates an electronic system according to an example embodiment.

FIG. 1 illustrates an electronic system according to an example embodiment. The electronic system 10 may include an image sensor 100, an image processing circuit 200, a memory 300, and a processor 400. The image sensor 100, the image processing circuit 200, and the memory 300 may be provided as an image sensor module 50. The electronic system 10 may include a device and a system, which are configured to capture and process images. For example, the electronic system 10 may be implemented as an electronic device including the image sensor module 50 and the processor 400, but the inventive concept is not limited thereto. Each of the image sensor module 50 and the processor 400 may be provided as a separate device.

Here, the electronic device may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MPEG-1 audio layer 3 (MP3) player, mobile medical equipment, a camera, and a wearable device. In addition, the electronic device may include a smart home appliance. The smart home appliance may include, for example, at least one of a television (TV), a digital video disk (DVD) player, an audio player, a refrigerator, an air conditioner, a vacuum cleaner, an oven, a microwave oven, a washing machine, an air purifier, a set-top box, a home automation control panel, a security control panel, a TV box, a game console, an electronic dictionary, an electronic key, a camcorder, or an electronic frame. Also, the electronic device may include various pieces of medical equipment. The various pieces of medical equipment may include, for example, various pieces of portable medical measuring equipment (e.g., a blood glucose meter, a heart rate meter, a blood pressure meter, a clinical thermometer, or the like), magnetic resonance angiography (MRA), magnetic resonance imaging (MRI), computed tomography (CT), a camera, an ultrasonic device, or the like.

The image sensor 100 may detect light incident through a lens and sense a value of each pixel, which is related to brightness or color. The image sensor 100 may obtain an image based on sensed values and output the obtained image. In an embodiment, the image sensor 100 may detect incident light during a plurality of exposure times and obtain a plurality of images corresponding to the plurality of exposure times. For example, the image sensor 100 may generate, from the same subject, the plurality of images consecutively for a shot. The plurality of images may have different exposure times. The plurality of images (i.e., a set of the plurality of images) may be collectively referred to as a multiple exposure image IMG_ME. In other words, the multiple exposure image IMG_ME may include a plurality of images having different exposure times. The image sensor 100 may provide the multiple exposure image IMG_ME to the image processing circuit 200. In an example embodiment, the image sensor 100 may include a complementary-metal-oxide-semiconductor (CMOS) image sensor. The image sensor 100, however, is not limited to a sensor of a specific name but may include all types of sensors capable of sensing a value of each pixel, which is related to brightness or color, due to incident light.

The image processing circuit 200 may process various images including the multiple exposure image IMG_ME, which is provided from the image sensor 100, by using various image processing techniques. For example, the image processing circuit 200 may compress or encode various images. For example, the image processing circuit 200 may compress the multiple exposure image IMG_ME and generate compression image data IMG_Comp. The image processing circuit 200 may provide the compression image data IMG_Comp to the processor 400. At least one piece of control information and/or image data, which is used for the image processing circuit 200 to process the images, may be stored in the memory 300.

The memory 300, which is a storage configured to store data, may store, for example, various image processing algorithms, various programs, and various pieces of data. The memory 300 may include at least one of a volatile memory and a non-volatile memory. The non-volatile memory may include read-only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), and/or ferroelectric RAM (FRAM). The volatile memory may include dynamic RAM (DRAM), static RAM (SRAM), synchronous DRAM (SDRAM), phase-change RAM (PRAM), magnetic RAM (MRAM), resistive RAM (RRAM), and/or ferroelectric RAM (FeRAM). Furthermore, in an embodiment, the memory 300 may include at least one of a hard disk drive (HDD), a solid-state drive (SSD), compact flash (CF), a secure digital (SD) memory, a micro-SD memory, a mini-SD memory, an extreme digital (xD) memory, and a memory stick. In an embodiment, the memory 300 may semi-permanently or temporarily store algorithms, programs, and a plurality of instructions, which are executed by the image processing circuit 200.

According to an example embodiment, the image processing circuit 200 may select a reference image, from among the plurality of images included in the multiple exposure image IMG_ME, generate at least one piece of packing data corresponding to at least one remaining image other than the reference image, from among the plurality of images, and generate the compression image data IMG_Comp based on the reference image and the at least one piece of packing data. In an embodiment, the image processing circuit 200 may select the reference image, from among the plurality of images, based on a brightness value. For example, the image processing circuit 200 may select a reference image corresponding to a shorter exposure time as the brightness value increases. Also, in an embodiment, the image processing circuit 200 may generate packing data corresponding to a corresponding image based on an exposure time ratio, the reference image, and the corresponding image. Here, the exposure time ratio may indicate a ratio of an exposure time of the corresponding image to an exposure time of the reference image. In an embodiment, the packing data may include at least one of saturation bits, sign bits, and disparity bits. The compression image data IMG_Comp will be described in further detail below with reference to FIGS. 4 to 10D.

The processor 400 may control various operations of the electronic system 10. As an example, the processor 400 may include a central processing unit (CPU) or an application processor (AP). The processor 400 may include a single core or a multiple core. In an embodiment, the processor 400 may reconstruct the plurality of images corresponding to the plurality of exposure times, based on the compression image data IMG_Comp provided by the image sensor module 50. For example, the processor 400 may decompress the compression image data IMG_Comp and reconstruct the plurality of images corresponding to the plurality of exposure times. The processor 400 may reconstruct the plurality of images by using a reference image and at least one piece of packing data, which are included in the compression image data IMG_Comp. The processor 400 may control various components of the electronic system 10 to perform a post-image processing operation, for example, on the plurality of reconstructed images. For example, the processor 400 may synthesize the plurality of reconstructed images to generate a high-dynamic-range (HDR) image, and provide the HDR image to a display unit (e.g., a display) included in the electronic system 10, and thus, the HDR image may be displayed to a user of the electronic system 10.

In the electronic system 10 according to the example embodiment, the image sensor module 50 may provide packing data corresponding to each of at least one remaining image along with the reference image, which is selected from among the plurality of images corresponding to the plurality of exposure times, as the compression image data IMG_Comp to the processor 400. Thus, the processor 400 may obtain the multiple exposure image IMG_ME corresponding to the plurality of exposure times instead of obtaining only the synthesized image, and the amount of data transmitted and received between the image sensor module 50 and the processor 400 may be reduced.

Figure 2:
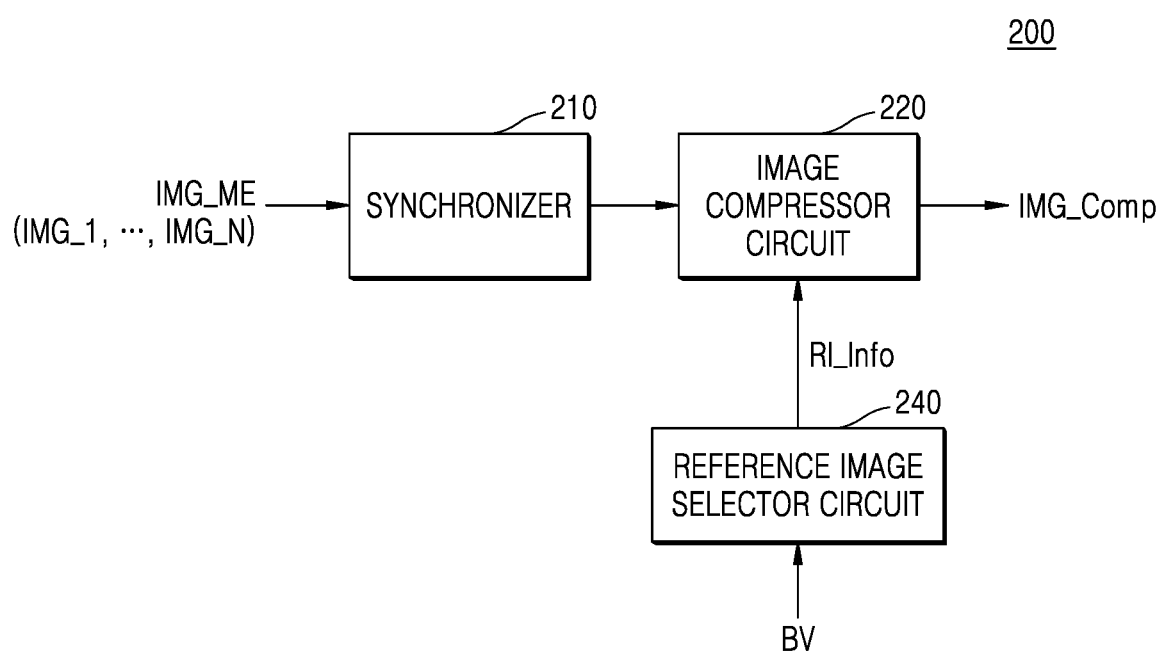
FIG. 2 illustrates an image processing circuit according to an example embodiment.

FIG. 2 illustrates an image processing circuit 200 according to an example embodiment. The image processing circuit 200 may correspond to the image processing circuit 200 of FIG. 1, and the same description as in FIG. 1 will be omitted. FIG. 2 will be described with reference to FIG. 1.

The image processing circuit 200 may include a synchronizer 210, an image compressor circuit 220, and a reference image selector circuit 240. In some embodiments, the synchronizer 210 is not included in the image processing circuit 200.

The image processing circuit 200 may receive the multiple exposure image IMG_ME from the image sensor 100. The multiple exposure image IMG_ME may include a plurality of images IMG_1, . . . , and IMG_N corresponding to a plurality of exposure times. Here, N is a natural number greater than or equal to 2. For example, an N-th image IMG_N may be an image corresponding to an exposure time, which is longer than an exposure time of a first image IMG_1. In an embodiment, the plurality of images IMG_1, . . . , IMG_N may have different exposure times.

The synchronizer 210 may synchronize phases of the plurality of images IMG_1, . . . , and IMG_N. For example, the plurality of images IMG_1, . . . , and IMG_N, which are in the state of raw image data, may have phases that are not equal to each other, and the synchronizer 210 may synchronize the phases of the plurality of images IMG_1, . . . , and IMG_N. The synchronizer 210 may provide the plurality of images IMG_1, . . . , and IMG_N of which phases are synchronized, to the image compressor circuit 220.

The reference image selector circuit 240 may provide reference image selection information RI_Info for selecting a reference image, from among the plurality of images IMG_1, . . . , and IMG_N, to the image compressor circuit 220, based on a brightness value BV. For example, the reference image selection information RI_Info may include information indicating which image the image compressor circuit 220 is to select as the reference image, from among the plurality of images IMG_1, . . . , and IMG_N. In an embodiment, the brightness value BV may be provided from the outside of the image sensor module 50. For example, the brightness value BV may be provided from the processor 400. However, the inventive concept is not limited thereto, and the brightness value BV may be generated inside the image sensor module 50. For example, the image processing circuit 200 may generate the brightness value BV by using at least some of pixel values of the plurality of images IMG_1, . . . , and IMG_N. In an embodiment, the reference image selector circuit 240 may output the reference image selection information RI_Info to select the first image IMG_1, from among the plurality of images IMG_1, . . . , and IMG_N, as the reference image in response to the brightness value BV of a first brightness value. The reference image selector circuit 240 may output the reference image selection information RI_Info to select a second image IMG_2, from among the plurality of images IMG_1, . . . , and IMG_N, as the reference image in response to the brightness value BV of a second brightness value lower than the first brightness value. Here, the second image IMG_2 may correspond to an exposure time, which is longer than the exposure time of the first image IMG_1. In an embodiment, the reference image selector circuit 220 may receive a brightness value BV and may output the reference image selection information RI_Info based on the brightness value BV. An image of a shorter exposure time may be selected as the reference image with the reference image selection information generated from a higher brightness value. In an embodiment, the reference image selector circuit 240 may generate the reference image selection information RI_Info based on a reference table including reference image lists corresponding to a plurality of brightness value ranges. The reference image selector circuit 240 will be described in further detail below with reference to FIG. 6.

The image compressor circuit 220 may select the reference image, from among the plurality of images IMG_1, . . . , and IMG_N, based on the reference image selection information RI_Info. The image compressor circuit 220 may generate at least one piece of packing data (i.e., at least one packing data) corresponding to at least one remaining image other than the reference image, from among the plurality of images IMG_1, . . . , and IMG_N. The image compressor circuit 220 may output the reference image with at least one piece of packing data. The image compressor circuit 220 may output compression image data IMG_Comp including the reference image and the at least one piece of packing data.

Figure 3:
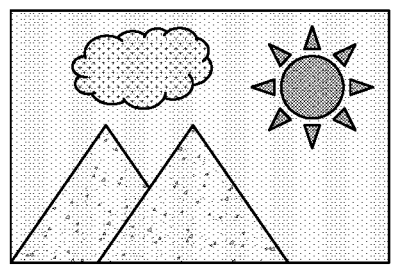
FIG. 3 illustrates images of a multiple exposure image, which correspond to a plurality of exposure times, according to an example embodiment.
Figure 3:
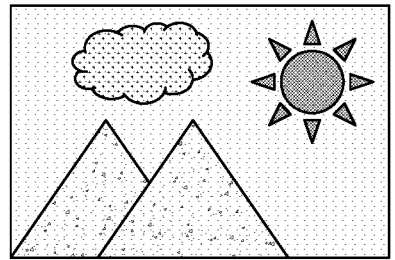
Figure 3:
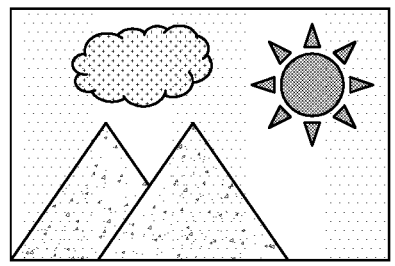

FIG. 3 illustrates images of a multiple exposure image corresponding to a plurality of exposure times, according to an example embodiment. FIG. 3 illustrates an example embodiment in which the multiple exposure image includes three images corresponding to three exposure times. The number of images included in the multiple exposure image and a ratio in brightness between the images are not limited to those shown in FIG. 3. FIG. 3 will be described with reference to FIGS. 1 and 2.

A multiple exposure image IMG_ME may include a first image IMG_1, a second image IMG_2, and a third image IMG_3. The first image IMG_1, the second image IMG_2, and the third image IMG_3 may be images obtained based on different exposure times. For example, an exposure time of the first image IMG_1 may be shorter than an exposure time of the second image IMG_2, and the exposure time of the second image IMG_2 may be shorter than an exposure time of the third image IMG_3. For example, when the first image IMG_1 is compared with the third image IMG_3, the overall subjects of the first image IMG_1 may be substantially the same as those of the third image IMG_3, and it can be seen that a brightness may be proportional to an exposure time. For example, when the first image IMG_1 is multiplied by a ratio of the exposure time of the third image IMG_3 to the exposure time of the first image IMG_1, the brightness of the first image IMG_1 after the multiplication may be substantially similar to that of the third image IMG_3.

The image processing circuit 200, according to an example embodiment, may compress images using linearity between a plurality of images and exposure times. For example, when the first image IMG_1 is selected as a reference image, the image compressor circuit 220 may multiply the first image IMG_1 by a ratio of the exposure time of the third image IMG_3 to the exposure time of the first image IMG_1, subtract the third image IMG_3 from the multiplication result, and generate third raw disparity data corresponding to the third image IMG_3. Packing data corresponding to the third image IMG_3 may be generated using the third raw disparity data. The method of generating the third raw disparity data may apply to the other remaining images IMG_2, IMG_4 to IMG_N. Due to linearity characteristics between the plurality of images and the exposure times, a capacity of the packing data may be much smaller than a capacity of each image. Thus, in an example embodiment, the amount of data transmitted and received between the image sensor module 50 and the processor 400 may be reduced.

FIG. 4 illustrates compression image data IMG_Comp according to an example embodiment. The compression image data IMG_Comp of FIG. 4 may correspond to the compression image data IMG_Comp described with reference to FIGS. 1 and 2. A description of the compression image data IMG_Comp, which is the same as in FIGS. 1 and 2, will be omitted.

The compression image data IMG_Comp may include a reference image IMG_Ref and at least one piece of packing data. The at least one piece of packing data may respectively correspond to at least one remaining image other than the reference image IMG_Ref, from among a plurality of images. For example, when a multiple exposure image IMG_ME includes N images, the compression image data IMG_Comp may include (N−1) packing data corresponding to the remaining images other than the reference image IMG_Ref. For example, the compression image data IMG_Comp may include first packing data DATA_Pack_1 and second to N-1-th packing data DATA_Pack_2 to DATA_Pack_N−1.

A configuration of each piece of the packing data will be described in further detail with reference to the following drawings.

Figure 5:
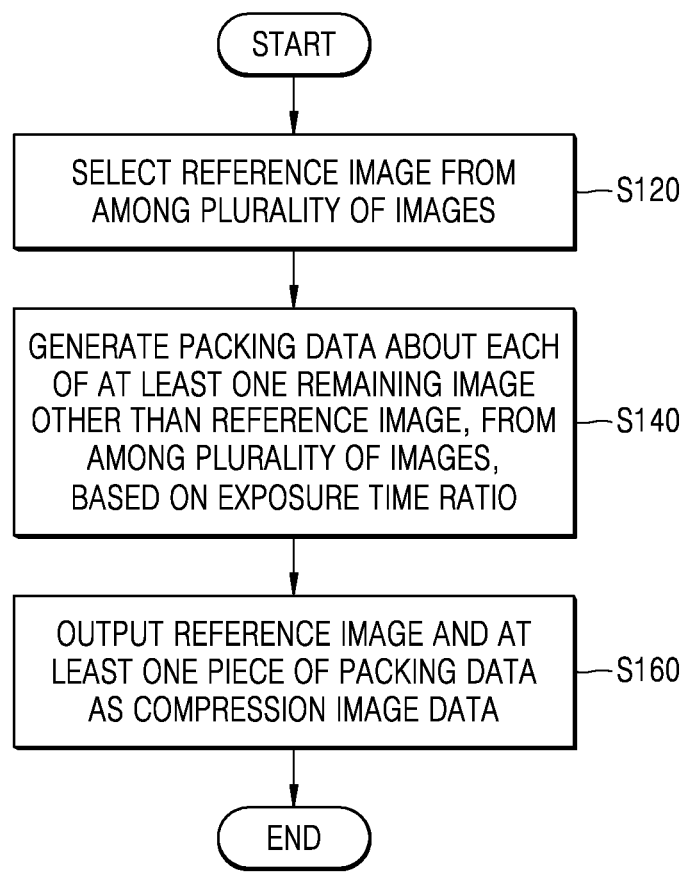
FIG. 5 is a flowchart of an image compression method of an image sensor module, according to an example embodiment.

FIG. 5 is a flowchart of an image compression method of an image sensor module 50, according to an example embodiment. The flowchart of FIG. 5 will be described with reference to FIGS. 1, 2, and 4.

The image sensor module 50 may obtain a plurality of images corresponding to a plurality of exposure times. The image sensor module 50 may select a reference image from among the plurality of images (S120). In an embodiment, the image sensor module 50 may select the reference image based on the brightness value BV. For example, as the brightness value BV increases, the image sensor module 50 may select an image corresponding to a shorter exposure time, from among the plurality of images. When the brightness value BV is high, there is a high possibility that some of pixel values of an image having a long exposure time may be saturated, and thus, the reliability of the image having the long exposure time may be reduced. Accordingly, an image corresponding to a short exposure time may be suitable as the reference image. Similarly, when the brightness value BV is low, the reliability of the image having the short exposure time may be reduced, while the reliability of the image having the long exposure time may be increased. Accordingly, the image corresponding to the long exposure time may be suitable as the reference image.

The image sensor module 50 may generate corresponding packing data about each of at least one remaining image other than the reference image, from among the plurality of images, based on an exposure time ratio (S140). For example, the image compressor circuit 220 may generate packing data based on a ratio of an exposure time of a corresponding image to an exposure time of the reference image, the reference image, and the corresponding image. The generation of the packing data will be described in further detail with reference to FIGS. 8 to 10D.

The image sensor module 50 may output the reference image and at least one piece of packing data as compression image data DATA_Comp (S160). For example, the image sensor module 50 may output compression image data DATA_Comp having a form (i.e., a data format) as shown in FIG. 4.

Figure 6:
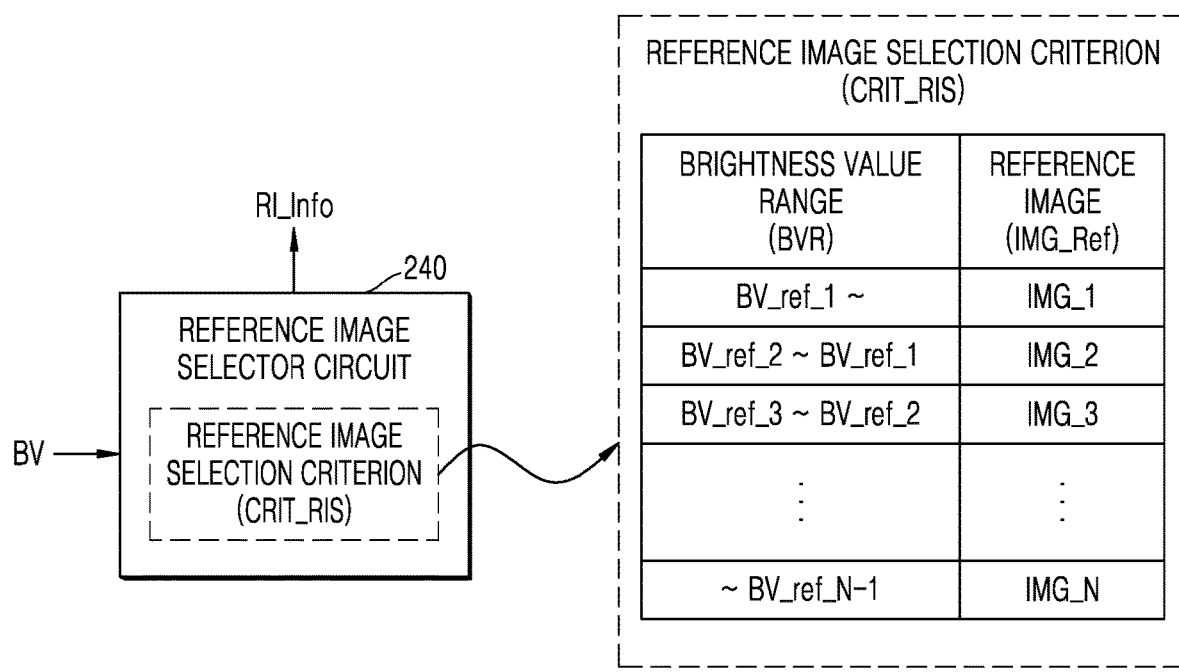
FIG. 6 illustrates a reference image selector circuit and reference image selection criterions according to an example embodiment.

FIG. 6 illustrates a reference image selector circuit 240 and reference image selection criteria CRIT_RIS according to an example embodiment. A description of the reference image selector circuit 240, which is the same as in FIGS. 1 and 2, will be omitted. The reference image selector circuit 240 will be described with reference to FIGS. 1 and 2.

The reference image selector circuit 240 may generate reference image selection information RI_Info based on a brightness value BV. In an embodiment, as the brightness value BV increases, the reference image selector circuit 240 may generate the reference image selection information RI_Info to select an image corresponding to a shorter exposure time as a reference image.

In an embodiment, the reference image selector circuit 240 may generate reference image selection information RI_Info based on a reference image selection criteria CRIT_RIS. The reference image selection criteria CRIT_RIS may include a table including reference image lists corresponding to a plurality of brightness value ranges.

For example, a first image IMG_1 may correspond to a brightness value range lower than a first reference brightness value BV_ref_1 inclusive. A second image IMG_2 may correspond to a brightness value range between a second reference brightness value BV_ref_2 and the first reference brightness value BV_ref_1. A third image IMG_3 may correspond to a brightness value range between a third reference brightness value BV_ref_3 and the second reference brightness value BV_ref_2. An N-th image IMG_N may correspond to a brightness value range greater than an N−1-th reference brightness value BV_ref_N−1 inclusive.

The reference image selector circuit 240 may generate reference image selection information RI_Info for selecting a reference image based on the reference image selection information RI_Info and the brightness value BV. The reference image selector circuit 240 may determine a brightness value range including the brightness value BV, from among the plurality of brightness value ranges, and generate the reference image selection information RI_Info, based on a reference image list corresponding to the determined brightness value range. In a non-limiting example, when the brightness value BV corresponds to a value between the second reference brightness value BV_ref_2 and the third reference brightness value BV_ref_3, the reference image selector circuit 240 may generate reference image selection information RI_Info for selecting the third image IMG_3 as the reference image.

Figures 7, 8:
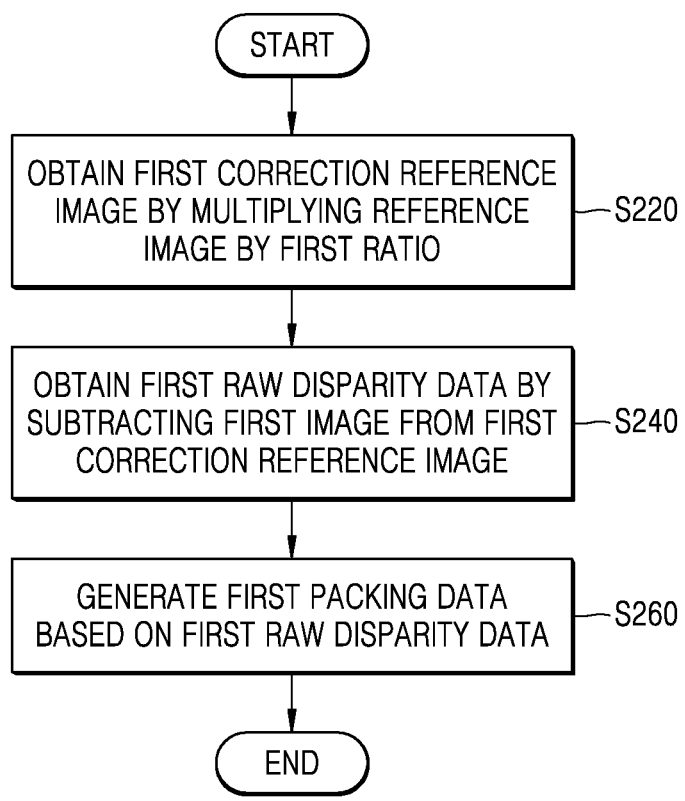
FIG. 7 is a flowchart of a method of generating packing data of an image sensor module, according to an example embodiment.
FIG. 8 illustrates first packing data according to an example embodiment.

FIG. 7 is a flowchart of a method of generating packing data of an image sensor module, according to an example embodiment. Specifically, FIG. 7 illustrates an example of a flowchart of a method of generating first packing data corresponding to the first image IMG_1 included in at least one remaining image, from among operation S140 of FIG. 5. FIG. 7 will be described with reference to FIGS. 1 and 2.

The image sensor module 50 may multiply a reference image selected based on a brightness value BV by a first ratio and obtain a first correction reference image (S220). For example, the image compressor circuit 220 may multiply the reference image by the first ratio, which indicates a ratio of an exposure time of the first image IMG_1 to an exposure time of the reference image, and obtain the first correction reference image.

The image sensor module 50 may subtract the first image IMG_1 from the first correction reference image and obtain first raw disparity data (S240). For example, the image compressor circuit 220 may subtract the first image IMG_1 from the first correction reference image obtained in operation S220 and obtain the first raw disparity data. The first raw disparity data may have the form of a matrix having the same size as the first image IMG_1 and the reference image. Due to the linearity between the images and the exposure times, which are described with reference to FIG. 3, each element value of the first raw disparity data may occupy only a small number of bits compared to each element value of the first image IMG_1.

The image sensor module 50 may generate first packing data based on the first raw disparity data (S260). For example, the image compressor circuit 220 may generate the first packing data based on the first raw disparity data. In an embodiment, the first packing data may include saturation data including saturation bits indicating whether each of the element values of the first raw disparity data exceeds a threshold value. In an embodiment, the first packing data may include sign data including sign bits indicating whether each of the element values of first raw disparity data is below a value of zero ("0"). In an embodiment, the first packing data may include first disparity data, which is an absolute value of the first raw disparity data. In an embodiment, the first packing data may include disparity bit data including disparity bits indicating bit numbers allocated to respective element values of disparity data. In an exemplary embodiment, a value of the disparity bits may be equal to a maximum number of binary bits representing the threshold value. For example, when the threshold value is 15 (1111 in a binary form), a value of the disparity bits may be four, which is a maximum bit numbers to represent the respective element values of the disparity data. The first packing data, according to an embodiment, will be described in further detail with reference to FIG. 8.

FIG. 8 illustrates first packing data DATA_Pack_1 according to an example embodiment. Specifically, FIG. 8 illustrates the first packing data described with reference to FIG. 7, according to an embodiment. FIG. 8 will be described with reference to FIGS. 1 and 2.

The first packing data DATA_Pack_1 may include saturation data DATA_Sat, sign data DATA_Sign, disparity bit data DATA_DB, and disparity data DATA_Disparity. However, the inventive concept is not limited thereto, and the first packing data DATA_Pack_1 does not include at least one of the saturation data DATA_Sat, the sign data DATA_Sign, and the disparity bit data DATA_DB.

The saturation data DATA_Sat may include saturation bits corresponding respectively to element values of first raw disparity data. Each of the saturation bits may indicate whether the element value of the first raw disparity data, which corresponds to the saturation bit, exceeds a threshold value. For example, when the corresponding element value of the first raw disparity data exceeds the threshold value, the corresponding saturation bit may have a first logic value (e.g., '1'). When the corresponding element value of the first raw disparity data does not exceed the threshold value, the corresponding saturation bit may have a second logic value (e.g., '0').

The sign data DATA_Sign may include sign bits corresponding respectively to the element values of the first raw disparity data. Each of the sign bits may indicate whether the element value of the first raw disparity data, which corresponds to the sign bit, is less than '0.' For example, when the corresponding element value of the first raw disparity data is less than '0,' the corresponding sign bit may have the first logic value (e.g., '1'). When the corresponding element value of the first raw disparity data is greater than or equal to '0,' the corresponding saturation bit may have the second logic value (e.g., '0').

The disparity data DATA_Disparity may have an absolute value of the first raw disparity data. In other words, each of element values of the disparity data DATA_Disparity may be equal to an absolute value of the element value of the first raw disparity data, which corresponds thereto.

The disparity bit data DATA_DB may indicate a bit number allocated to each of the element values of the first raw disparity data. For example, when 4 bits are allocated to each of the element values of the first raw disparity data, element values of the disparity bit data DATA_DB corresponding thereto may be indicated by a binary number of '0100.'

A method of generating the first packing data DATA_Pack_1 will be described in further detail below with reference to FIG. 9.

Figure 9:
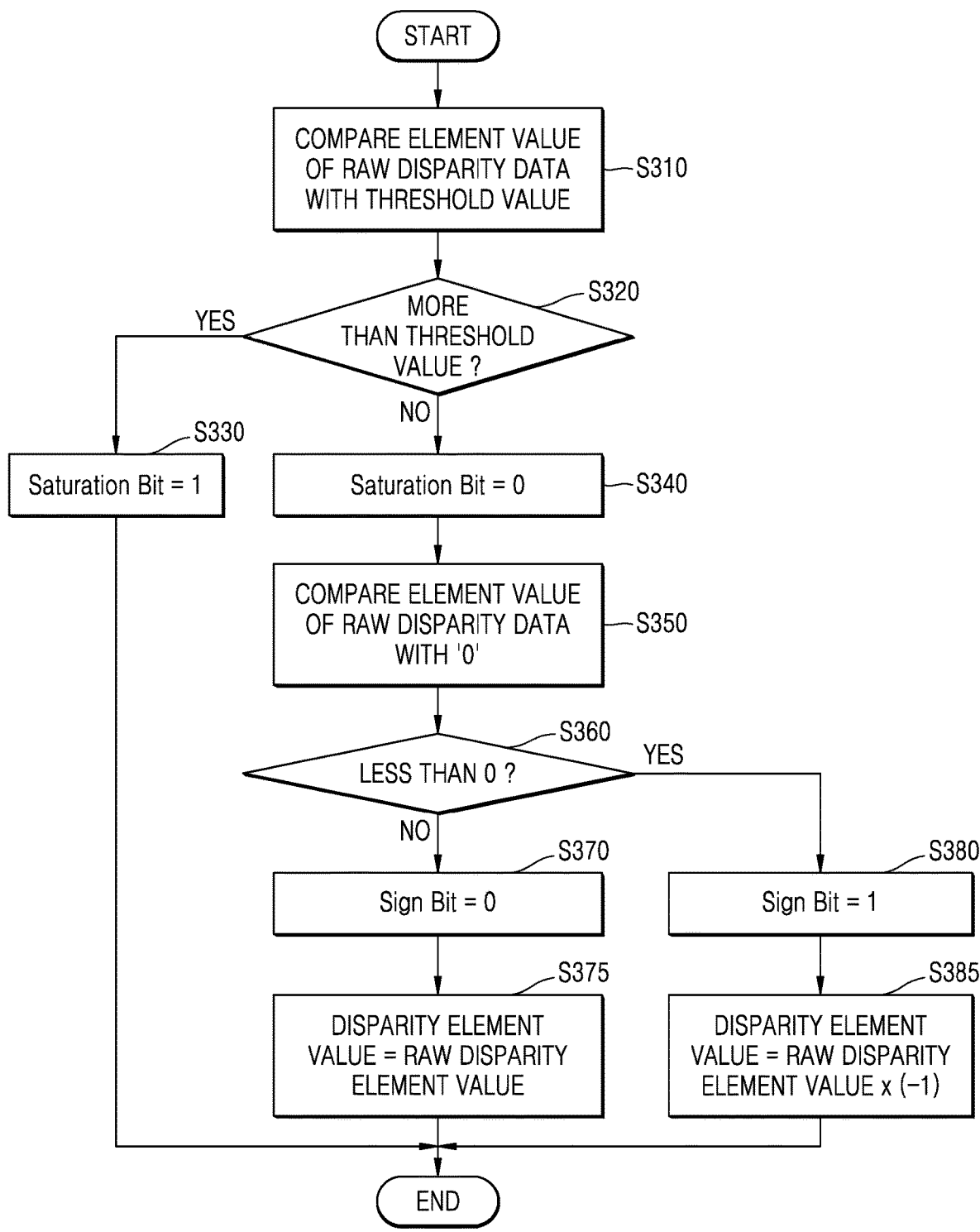
FIG. 9 is a flowchart of a method of generating packing data of an image sensor module, according to an example embodiment.

FIG. 9 is a flowchart of a method of generating packing data of an image sensor module 50, according to an example embodiment. Specifically, FIG. 9 is a flowchart of a method of constructing packing data based on raw disparity data. FIG. 9 will be exemplarily described on the assumption that first packing data DATA_Pack_1 corresponding to a first image IMG_1 is configured as shown in FIG. 8. FIG. 9 will be described with reference to FIGS. 1, 2, and 8.

The image sensor module 50 may compare an element value of first raw disparity data with a threshold value (S310). For example, the image compressor circuit 220 may compare element values corresponding to coordinate values of each piece of the first raw disparity data with the threshold value. The threshold value, which is a preset value, may be differently set according to an embodiment.

A subsequent operation may be differently performed depending on whether the element value of the first raw disparity data exceeds the threshold value (S320).

When the element value of the first raw disparity data exceeds the threshold value, a saturation bit corresponding to the element value may have a first logic value (e.g., '1') (S330). According to an embodiment, a value of disparity data may be set to '0000.'

When the element value of the first raw disparity data does not exceed the threshold value, the saturation bit corresponding to the element value may have a second logic value (e.g., '0') (S340).

The image sensor module 50 may compare the element value of the first raw disparity data with '0' (S350). For example, the image compressor circuit 220 may compare the element values corresponding to each piece of the first raw disparity data with '0.'

A subsequent operation may be differently performed depending on whether the element value of the first raw disparity data is below '0' (S360).

When the element value of the first raw disparity data is equal to or greater than '0,' a sign bit corresponding to the element value may have a second logic value (e.g., '0') (S370). In this case, an element value of disparity data, which corresponds to the element value, may be set to be equal to the element value of the first raw disparity data (S375).

When the element value of the first raw disparity data is less than '0,' the sign bit corresponding to the element value may have a first logic value (e.g., '1') (S380). In this case, the element value of the disparity data, which corresponds to the element value, may be set to a value obtained by multiplying the element value of the first raw disparity data by '−1' (S385).

FIGS. 10A to 10D are diagrams illustrating a process of generating compression image data based on a multiple exposure image, according to an example embodiment. FIGS. 10A to 10D will be exemplarily described on the assumption that the multiple exposure image includes a first image IMG_1, a second image IMG_2, and a third image IMG_3 and the first image IMG_1 is selected as a reference image. Also, a ratio among an exposure time of the first image IMG_1, an exposure time of the second image IMG_2, and an exposure time of the third image IMG_3 may be assumed to be 1:3:9. FIGS. 10A to 10D will be described with reference to FIGS. 1, 2, and 8.

Referring to FIG. 10A, each of the first image IMG_1, the second image IMG_2, and the third image IMG_3 may include 'w' columns and 'h' rows. In other words, each of the first image IMG_1, the second image IMG_2, and the third image IMG_3 may have w*h element values (or pixel values). As an example, an element value (or pixel value) corresponding to a (1,1) coordinate of the first image IMG_1 may be '20,' and an element value corresponding to a (1,2) coordinate of the first image IMG_1 may be '40.' The remaining element values may be understood in the same manner as described above. The image compressor circuit 220 may select the first image IMG_1 as the reference image based on reference image selection information RI_Info, generate pieces of packing data corresponding to the remaining images (e.g., the second image IMG_2 and the third image IMG_3), and output the first image IMG_1 and the packing data as compression image data IMG_Comp. Referring back to the flowchart of FIG. 7 and the description thereof, the image compressor circuit 220 may obtain second raw disparity data to generate second packing data corresponding to the second image IMG_2, and obtain third raw disparity data to generate third packing data corresponding to the third image IMG_3. The process of obtaining the second raw disparity data and the third raw disparity data will be described in further detail with reference to FIG. 10B.

Referring to FIGS. 10A and 10B, the image compressor circuit 220 may multiply the first image IMG_1, which is the reference image, by '3,' which is a ratio of the exposure time of the second image IMG_2 to the exposure time of the first image IMG_1, subtract the second image IMG_2 from the multiplication result, and obtain second raw disparity data DATA_Disparity_Raw_2. For example, an element value corresponding to an (i,j) coordinate of the second raw disparity data DATA_Disparity_Raw_2 may be obtained by multiplying a corresponding element value of the first image IMG_1 by '3' and subtracting a corresponding value of the second image IMG_2 from the multiplication result, as expressed in Equation 1 below. Herein, DRV2(i,j) denotes an element value corresponding to the (i,j) coordinate of the second raw disparity data DATA_Disparity_Raw_2, IPV1(i,j) denotes an element value of an (i,j) coordinate of the first image IMG_1, and IPV2(i,j) denotes an element value of an (i,j) coordinate of the second image IMG_2.

$$DRV2(i,j)=IPV1(i,j)*3-IPV2(i,j) \quad (1)$$

For example, '62,' which is the corresponding element value of the second image IMG_2, may be subtracted from '60,' which is a value obtained by multiplying '20,' which is the corresponding element value of the second image IMG_2, by '3.' Thus, a value of '−2' may be obtained as an element value corresponding to a (1,1) coordinate of the second raw disparity data DATA_Disparity_Raw_2. Element values corresponding to other coordinates may be understood in the same manner as described above.

Similarly, the image compressor circuit 220 may multiply the first image IMG_1, which is the reference image, by '9,' which is a ratio of the exposure image of the third image IMG_3 to the exposure time of the first image IMG_1, subtract the third image IMG_3 from the multiplication result, and obtain third raw disparity data DATA_Disparity_Raw_3. For example, an element value corresponding to an (i,j) coordinate of the third raw disparity data DATA_Disparity_Raw_3 may be obtained by multiplying a corresponding element value of the first image IMG_1 by '9' and subtracting a corresponding element value of the third image IMG_3 from the multiplication result, as expressed in Equation 2 below. Herein, DRV3(i,j) denotes an element value corresponding to an (i,j) coordinate of the third raw disparity data DATA_Disparity_Raw_3, IPV1(i,j) denotes the element value corresponding to the (i,j) coordinate of the first image IMG_1, and IPV3(i,j) denotes an element value corresponding to the (i,j) coordinate of the third image IMG_3.

$$DRV3(i,j)=IPV1(i,j)*9-IPV3(i,j) \quad (2)$$

For example, '190,' which is the corresponding element value of the third image IMG_3, may be subtracted from '180,' which is a value obtained by multiplying '20,' which is the corresponding element value of the first image IMG_1, by '9.' Thus, a value of '−10' may be obtained as an element value corresponding to a (1,1) coordinate of the third raw disparity data DATA_Disparity_Raw_3. Element values corresponding to other coordinates may be understood in the same manner as described above.

The image compressor circuit 220 may generate the second packing data based on the second raw disparity data DATA_Disparity_Raw_2 and generate the third packing data based on the third raw disparity data DATA_Disparity_Raw_3, as described in further detail below with reference to FIGS. 10C and 10D.

Referring to FIG. 10C, the image compressor circuit 220 may generate the second packing data based on the second raw disparity data DATA_Disparity_Raw_2.

Saturation data DATA_Sat may include saturation bits corresponding to respective coordinates. Because each of all element values included in the second raw disparity data DATA_Disparity_Raw_2 is less than a threshold value of '15,' all the saturation bits may have a second logic value (e.g., '0').

Sign data DATA_Sign may include sign bits corresponding to respective coordinates. Because element values of the second raw disparity data DATA_Disparity_Raw_2 corresponding to a (1,1) coordinate and a (2,1) coordinate are below '0,' sign bits corresponding thereto may have a first logic value (e.g., '1'). In contrast, because element values of the second raw disparity data DATA_Disparity_Raw_2 corresponding to a (1,2) coordinate, a (1,w) coordinate, a (2,2) coordinate, an (h,1) coordinate, and an (h,w) coordinate are greater than or equal to '0,' sign bits corresponding thereto may have a second logic value (e.g., '0').

Disparity bit data DATA_DB may indicate a bit number allocated to an element value of disparity data corresponding thereto. For example, when four bits are allocated to the disparity data, disparity bits included in the disparity bit data DATA_DB may have a value '0100.'

Disparity data DATA_Disparity may be an absolute value of the second raw disparity data DATA_Disparity_Raw_2. In other words, each of element values of the disparity data DATA_Disparity may be equal to an absolute value of the element value of the second raw disparity data DATA_Disparity_Raw_2, which corresponds thereto.

Referring to FIG. 10D, the image compressor circuit 220 may generate the third packing data based on the third raw disparity data DATA_Disparity_Raw_3.

The saturation data DATA_Sat may include saturation bits corresponding to respective coordinates. Because element values of the third raw disparity data DATA_Disparity_Raw_3 corresponding to a (1,w) coordinate, an (h,1) coordinate, and an (h,w) coordinate are greater than the threshold value of '15,' saturation bits corresponding thereto may have the first logic value (e.g., '1'). Also, a disparity value corresponding to the element values of the third raw disparity data DATA_Disparity_Raw_3 may be '0000.' In contrast, because element values of the third raw disparity data DATA_Disparity_Raw_3 corresponding to a (1,1) coordinate, a (1,2) coordinate, a (2,1) coordinate, and a (2,2) coordinate are not greater than the threshold value of '15,' saturation bits corresponding thereto may have the second logic value (e.g., '0').

The sign data DATA_Sign may include sign bits corresponding to respective coordinates. Because the element values of the third raw disparity data DATA_Disparity_Raw_3 corresponding to the (1,1) coordinate, the (1,2) coordinate, and the (1,w) coordinate are below '0,' sign bits corresponding thereto may have the first logic value (e.g., '1'). In contrast, when the element of the third raw disparity data DATA_Disparity_Raw_3 corresponding to the (2,2) coordinate is greater than or equal to '0,' a sign bit corresponding thereto may have the second logic value (e.g., '0').

The disparity bit data DATA_DB may indicate a bit number allocated to an element value of the disparity data DATA_Disparity corresponding thereto. For example, when 4 bits are allocated to the disparity data DATA_Disparity, disparity bits included in the disparity bit data DATA_DB may have a value of '0100.'

The disparity data DATA_Disparity may be an absolute value of the third raw disparity data DATA_Disparity_Raw_3 except that a saturation bit corresponding thereto is '1.' In other words, each of the element values of the disparity data DATA_Disparity may be equal to an absolute value of a corresponding element value of the third raw disparity data DATA_Disparity_Raw_3.

The image compressor circuit 220 may provide the first image IMG_1 serving as the reference image, the second packing data DATA_Pack_2, and the third packing data DATA_Pack_3 as compression image data IMG_Comp to the processor 400.

Figure 11:
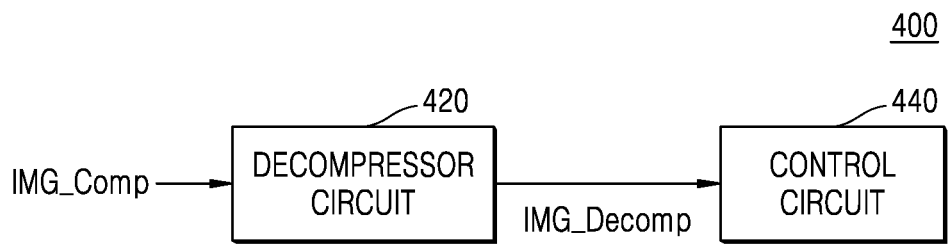
FIG. 11 illustrates a processor according to an example embodiment.

FIG. 11 illustrates a processor 400 according to an example embodiment. The processor 400 may include a decompressor circuit 420 and a control circuit 440. FIG. 11 will be described with reference to FIG. 1.

The decompressor circuit 420 may decompress compression image data IMG_Comp and generate a plurality of decompression images IMG_Decomp corresponding to a plurality of exposure times. In an embodiment, the decompressor circuit 420 may generate (or reconstruct) an image corresponding to packing data, based on the reference image and the packing data, which are included in the compression image data IMG_Comp. A decompression method of the decompressor circuit 420 will be described below in further detail with reference to FIG. 12. The decompressor circuit 420 may provide the plurality of decompression images IMG_Decomp to the control circuit 440.

The control circuit 440 may control the electronic system 10 based on the plurality of decompression images IMG_Decomp. Alternatively, the control circuit 440 may control any other component of the electronic system 10 based on the plurality of decompression images IMG_Decomp. For example, the control circuit 440 may synthesize the plurality of decompression images IMG_Decomp and generate HDR image data. Also, the control circuit 440 may control a display function of the electronic system 10 to display the generated HDR image data.

Figure 12:
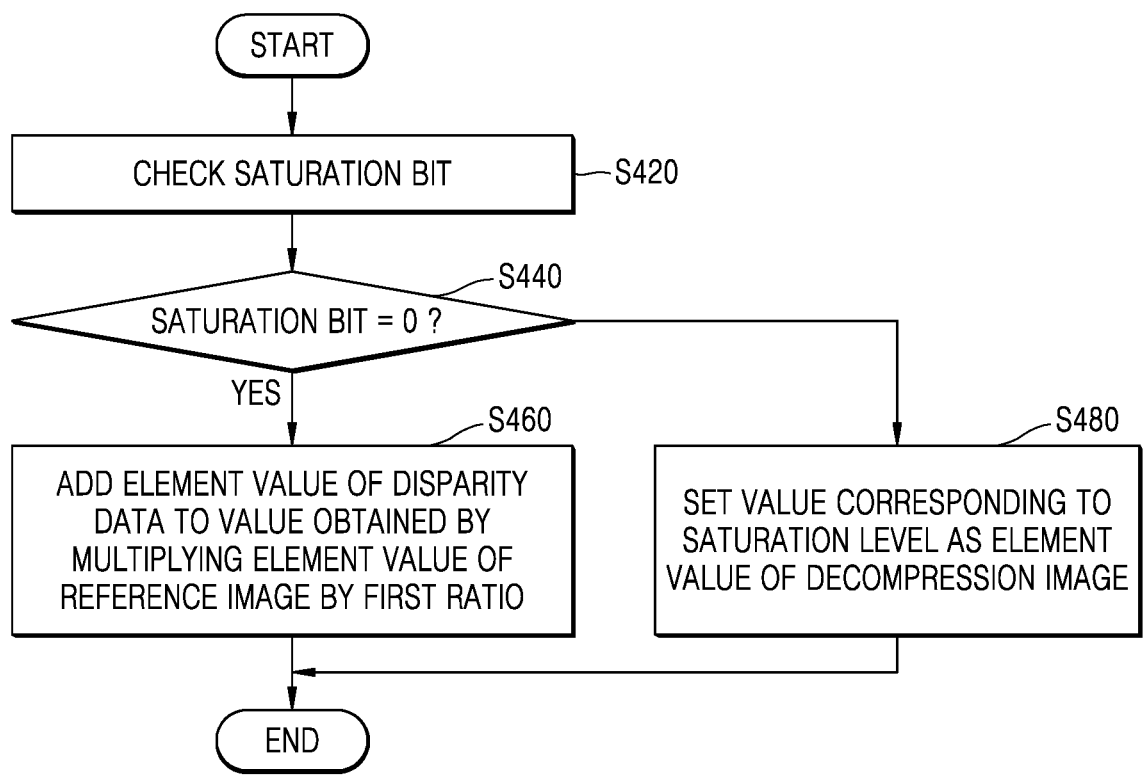
FIG. 12 is a flowchart of an image decompression method of a processor, according to an example embodiment.

FIG. 12 is a flowchart of an image decompression method of the processor 400, according to an example embodiment. FIG. 12 will be described with reference to FIGS. 1 and 11.

For brevity, it is assumed that a reference image is included in compression image data IMG_Comp and a first image is reconstructed based on first packing data. In this case, a ratio of an exposure time of the first image to an exposure time of the reference image will be referred to as a first ratio.

The processor 400 may check saturation bits included in the first packing data (S420). For example, the decompressor circuit 420 may check saturation bits corresponding to a plurality of coordinates, based on saturation data included in the first packing data (S420).

A subsequent operation may be differently performed depending on whether a saturation bit is at a second logic level '0' (S440).

When the saturation bit is at the second logic level '0,' for a corresponding coordinate, the decompressor circuit 420 may multiply an element value of the corresponding coordinate of the reference image and a value of the first ratio, and add an element value of disparity data for the corresponding coordinate and the multiplied value. The decompressor circuit 420 may obtain the added value as an element value of the first image (S460). That is, for example, an image may be reconstructed using an inverse operation of Equation 1.

When the saturation bit is at the second logic level '0,' for a corresponding coordinate, the decompressor circuit 420 may set a value corresponding to a saturation level to the element value of the first image (S480).

While the inventive concept has been particularly shown and described with reference to embodiments thereof, it will be understood that various changes in form and details may be made therein without departing from the spirit and scope of the following claims.

What is claimed is:

1. An image sensor module comprising:
an image sensor,
wherein the image sensor module is configured such that the image sensor outputs a plurality of images, and
wherein the plurality of images have a plurality of exposure times different from each other;
a reference image selector circuit configured to output reference image selection information for selecting a reference image, from among the plurality of images, based on a reference brightness value; and
an image compressor circuit configured to output a compression image data including at least one packing data and the reference image, based on the reference image selection information,
wherein the at least one packing data respectively corresponds to at least one remaining image other than the reference image, from among the plurality of images, and is generated based on a ratio of an exposure time of a corresponding image to an exposure time of the reference image.

2. The image sensor module of claim 1,
wherein the reference image selector circuit is configured to:
receive the reference brightness value; and
output the reference image selection information based on the reference brightness value, and
wherein the reference image selector circuit is configured to select an image, among from the plurality of images, of a shorter exposure time as the reference image using the reference image selection information generated based on a higher reference brightness value.

3. The image sensor module of claim 1,
wherein the reference image selector circuit is configured to:
determine a brightness value range to which the reference brightness value belongs, from among a plurality of brightness value ranges, based on a table comprising image lists corresponding to the plurality of brightness value ranges; and
output the reference image selection information to select an image, among the plurality of images, corresponding to the determined brightness value range as the reference image.

4. The image sensor module of claim 1,
wherein the at least one remaining image comprises a first image of the plurality of images,
wherein the image compressor circuit is configured to generate first packing data corresponding to the first image by using a first ratio, and
wherein the first ratio indicates a ratio of an exposure time of the first image to an exposure time of the reference image.

5. The image sensor module of claim 4,
wherein the image compressor circuit is configured to:
obtain a first correction reference image by multiplying the reference image by the first ratio;
subtract, pixel-by-pixel, a brightness value of the first image from a brightness value of the first correction reference image to generate first raw disparity data; and
generate the first packing data corresponding to the first image based on the first raw disparity data.

6. The image sensor module of claim 5,
wherein the first raw disparity data include a plurality of element values arranged in a matrix form,
wherein the first packing data comprises a plurality of saturation bits, and
wherein each of the plurality of saturation bits indicates whether a corresponding element value of the first raw disparity data having the matrix form exceeds a threshold value.

7. The image sensor module of claim 5,
wherein the first raw disparity data include a plurality of element values arranged in a matrix form,
wherein the first packing data comprises a plurality of sign bits, and
wherein each of the plurality of sign bits indicates whether a corresponding element value of the first raw disparity data having the matrix form is below zero.

8. The image sensor module of claim 7,
wherein the first packing data further comprises a plurality of absolute values, and
wherein each of the plurality of absolute values indicates an absolute value of a corresponding element value of the first raw disparity data.

9. The image sensor module of claim 6,
wherein the first packing data comprises a disparity bit indicating a bit number, in a binary form, allocated to represent a value of each of the plurality of element values of the first raw disparity data, and
wherein a value of the disparity bit is equal to the threshold value.

10. An image compression method of an image sensor module, the method comprising:
obtaining a plurality of images corresponding to a plurality of exposure times;
selecting a reference image based on a reference brightness value from among the plurality of images;
generating at least one packing data,
wherein the at least one packing data respectively corresponds to at least one remaining image other than the reference image from among the plurality of images, and
wherein each of the at least one packing data comprises a disparity indicating a difference between a correction reference image, which corresponds to the reference image corrected based on an exposure time ratio of an exposure time of a corresponding image to an exposure time of the reference image, and the corresponding image; and
outputting the reference image and the at least one packing data as compressed image data.

11. The method of claim 10,
wherein the selecting of the reference image comprises selecting an image, from among the plurality of images, corresponding to a shorter exposure time, from among the plurality of images, as the reference brightness value increases.

12. The method of claim 10,
wherein the reference brightness value is provided from the outside of the image sensor module or obtained by the image sensor module based on the plurality of images.

13. The method of claim 10,
wherein the at least one remaining image comprises a first image of the plurality of images,
wherein the generating of the at least one packing data comprises generating first packing data corresponding to the first image, by using a first ratio,
wherein the first ratio indicates a ratio of an exposure time of the first image to an exposure time of the reference image.

14. The method of claim 13,
wherein the generating of the first packing data comprises:
generating a first correction reference image by multiplying the reference image by the first ratio;
generating first raw disparity data by subtracting, pixel-by-pixel, a brightness value of the first image from a brightness value of the first correction reference image; and
generating the first packing data based on the first raw disparity data.

15. The method of claim 14,
wherein the first raw disparity data include a plurality of element values arranged in a matrix form, and
wherein the generating of the first packing data based on the first raw disparity data comprises:
generating a plurality of saturation bits, each of the plurality of saturation bits indicating whether a corresponding element value of the first raw disparity data in the matrix form exceeds a threshold value;
generating a plurality of sign bits, each of the plurality of sign bits indicating whether a corresponding element value of the first raw disparity data in the matrix form is below zero; and
generating the first packing data using the plurality of saturation bits, the plurality of sign bits, and an absolute value of each of the plurality of element values of the first raw disparity data.

16. An electronic device comprising:
an image sensor module configured to:
generate a plurality of images corresponding to a plurality of exposure times; and
output compression image data including at least one packing data and a reference image selected from among the plurality of images,
wherein the at least one packing data respectively corresponds to at least one remaining image other than the reference image; and
a processor configured to:
reconstruct the at least one remaining image from the compression image data, based on information about the reference image, the at least one packing data, and the plurality of exposure times; and
generate a high-dynamic-range (HDR) image based on the reference image and the at least one remaining image that is reconstructed.

17. The electronic device of claim 16,
wherein the image sensor module comprises:
an image sensor, wherein the image sensor module is configured such that the image sensor generates the plurality of images;
a reference image selector circuit configured to output reference image selection information for selecting the reference image, from among the plurality of images, based on a reference brightness value; and
an image compressor circuit configured to output a compression image data including the reference image and the at least one packing data, based on the reference image selection information.

18. The electronic device of claim 17, wherein the reference image selector circuit is configured to:
receive the reference brightness value; and
output the reference image selection information, and
wherein the reference image selector circuit is configured to select an image, among from the plurality of images, of a shorter exposure time as the reference image using the reference image selection information generated based on a higher reference brightness value.

19. The electronic device of claim 17,
wherein the at least one remaining image comprises a first image of the plurality of images,
wherein the image compressor circuit is configured to:
obtain a first correction reference image by multiplying the reference image by a first ratio;
subtract, pixel-by-pixel, a brightness value of the first image from a brightness value of the first correction reference image to generate a plurality of first raw disparity data; and
generate first packing data corresponding to the first image based on the plurality of first raw disparity data, and
wherein the first ratio indicates a ratio of an exposure time of the first image to an exposure time of the reference image.

20. The electronic device of claim 19,
wherein the image compressor circuit generates the first packing data using a plurality of saturation bits, a plurality of sign bits, and a plurality of first disparity data,
wherein each of the plurality of saturation bits indicates whether a corresponding value of the plurality of first raw disparity data exceeds a threshold value,
wherein each of the plurality of sign bits indicates whether a corresponding value of the plurality of first raw disparity data is below zero, and
wherein each of the plurality of first disparity data indicates an absolute value of a corresponding value of the plurality of first raw disparity data.

* * * * *